(12) United States Patent  
Torquato et al.

(10) Patent No.: US 12,162,025 B2  
(45) Date of Patent: Dec. 10, 2024

(54) PROCESS OF DISPOSAL IN PILES OF TAILINGS STEMMING FROM THE IRON ORE PROCESSING METHOD

(71) Applicant: Vale S.A., Rio de Janeiro (BR)

(72) Inventors: Nilton Carlos Torquato, Belo Horizonte (BR); Washington Pirete Da Silva, Nova Lima (BR)

(73) Assignee: Vale S.A., Rio de Janeiro (BR)

( * ) Notice: Subject to any disclaimer, the term of this patent is extended or adjusted under 35 U.S.C. 154(b) by 464 days.

(21) Appl. No.: 17/595,541

(22) PCT Filed: May 13, 2020

(86) PCT No.: PCT/BR2020/050157  
§ 371 (c)(1),  
(2) Date: Nov. 18, 2021

(87) PCT Pub. No.: WO2020/237333  
PCT Pub. Date: Dec. 3, 2020

(65) Prior Publication Data  
US 2022/0258180 A1 Aug. 18, 2022

(30) Foreign Application Priority Data  
May 24, 2019 (BR) .......................... 1020190107120

(51) Int. Cl.  
*B03D 3/06* (2006.01)  
*B01D 21/01* (2006.01)  
(Continued)

(52) U.S. Cl.  
CPC .................. *B03D 3/06* (2013.01); *B09B 3/70* (2022.01); *C02F 11/121* (2013.01); *C02F 11/14* (2013.01);  
(Continued)

(58) Field of Classification Search  
CPC . B03D 3/06; B03D 1/08; B03D 1/087; B03D 1/10; B03D 2201/002;  
(Continued)

(56) References Cited

U.S. PATENT DOCUMENTS

2018/0111131 A1* 4/2018 Filmer .................... B03D 1/10  
2021/0278390 A1* 9/2021 Gillis ..................... G01N 11/14

FOREIGN PATENT DOCUMENTS

BR 0111278 B1 2/2012  
CN 101234770 A 8/2008  
(Continued)

OTHER PUBLICATIONS

International Search Report for International Patent Application No. PCT/BR2020/050157, dated Aug. 13, 2020 (7 pages).  
(Continued)

*Primary Examiner* — Fred Prince  
(74) *Attorney, Agent, or Firm* — ARENTFOX SCHIFF LLP (57) ABSTRACT

The present invention discloses a process of disposal of tailings in piles stemming from the iron ore processing method, replacing dams, and comprising the steps of thickening the ultra-fine tailings, thickening the sandy tailings, mixing the tailings in the proportion of 80 to 90% by weight of sandy tailings and 10 to 20% by weight of ultra-fine tailings, addition of coagulant, addition of flocculant, filtering the mixture and piling the filtered tailings. Unlike traditional processes, this invention promotes an economically and technically feasible tailing disposal process that can be added to any conventional iron ore concentration plant without the need for any change in the process flowchart.

8 Claims, 6 Drawing Sheets

(51) Int. Cl.

| | |
|---|---|
| *B03D 1/08* | (2006.01) |
| *B03D 1/10* | (2006.01) |
| *B09B 3/25* | (2022.01) |
| *B09B 3/70* | (2022.01) |
| *C02F 11/12* | (2019.01) |
| *C02F 11/121* | (2019.01) |
| *C02F 11/14* | (2019.01) |
| *C02F 11/143* | (2019.01) |
| *C02F 11/147* | (2019.01) |
| *C02F 103/10* | (2006.01) |

(52) U.S. Cl.
CPC .......... *C02F 11/143* (2019.01); *C02F 11/147* (2019.01); *B01D 21/01* (2013.01); *B01D 2221/04* (2013.01); *B03D 1/08* (2013.01); *B03D 1/087* (2013.01); *B03D 1/10* (2013.01); *B03D 2201/002* (2013.01); *B03D 2203/02* (2013.01); *B09B 3/25* (2022.01); *C02F 2103/10* (2013.01); *Y02W 30/52* (2015.05)

(58) Field of Classification Search
CPC ......... B03D 2203/02; B09B 3/70; B09B 3/25; C02F 11/121; C02F 11/14; C02F 11/143; C02F 11/147; C02F 2103/10; B01D 21/01; B01D 2221/04; Y02W 30/52

USPC ........................................ 210/705, 252, 259
See application file for complete search history.

(56) References Cited

FOREIGN PATENT DOCUMENTS

| | | | |
|---|---|---|---|
| CN | 103977883 A | 8/2014 | |
| WO | 2015168378 A1 | 11/2015 | |
| WO | WO-2018022352 A1 * | 2/2018 | .......... B01F 11/0094 |

OTHER PUBLICATIONS

IAI; EAA. Bauxite Residue Mangement: Best Practice. International Aluminium Institute (IAI); European Aluminium Association (EAA). Jul. 2015.

Sofra, Fiona; Boger, David V. Environmental rheology for waste minimisation in the minerals industry. Chemical Engineering Journal, v. 86, n. 3, p. 319-330, Apr. 28, 2002. Elsevier BV. http://dx.doi.org/10.1016/s 1385-8947(01) 00225-x.

Evans, Ken. The History, Challenges, and New Developments in the Management and Use of Bauxite Residue. Journal of Sustainable Metallurgy, v. 2, n. 4, p. 316-331, 19 maio 2016. Springer Science and Business Media LLC. http://dx.doi.org/10.1007/s40831-016-0060-x.

Prasad, P. M.; Chandwani, H. K.; Mahadevan, H. Disposal practices for bauxite tailings at the alumina refineries. Transactions of the Indian Institute of Metals, v. 49, n. 6, p. 817-839, 1996.

Nery, Kellen; Avila, Joaquim; Scarminio, Milton; Bittar, Luciana; Moreno, Rodrigo; Seno, Roberto. Study of Alternative Technologies for Residue Disposal (Red Mud). In: Grandfield, John (ed.) Light Metals 2014, p. 161-163. Springer, Cham. http://dx.doi.org/10.1007 /978-3-319-48144-9 _ 28.

Solymar, Karoly; Sajo, Istvan; Steiner, Janos; Zoldi, Jozsef. Characteristics and separability of red mud. Light Metals 1992, 209-223.

Castro, Marcelo M.; Trindade, Carlos R.A.; Pantoja, Ronaldo G.; Alv Es Junior, Eduardo R.Q.A.; Martins, Armenio R. A New Technology for Dry Disposal of Alunorte's Bauxite Residue. In: Sadler B.A. (eds) Light Metals 2013. The Minerals, Metals & Materials Series. 2016. Springer, Cham. https://doi.org/10.1007 /978-3-319-65136-1 _ 19.

* cited by examiner

PROCESS OF DISPOSAL IN PILES OF TAILINGS STEMMING FROM THE IRON ORE PROCESSING METHOD

This application is a 35 U.S.C. § 371 National Phase of PCT Application No. PCT/BR2020/050157, filed on May 13, 2020, which claims priority to Brazilian Patent Application No. BR1020190107120, filed May 24, 2019, the disclosures of each of which are hereby incorporated by reference in their entireties.

FIELD OF THE INVENTION

The present invention refers to a process of disposal of tailings stemming from the iron ore processing method, in piles, destined mainly to the mining industry.

BACKGROUND TO THE INVENTION

The iron ore processing method seeks to take the material resulting from the extraction (mined material) and then separate and concentrate the desired materials with high iron content and, consequently, high added economic value. The process that is most used by the mining industry comprises stages that consist mainly of unit operations of mined ore comminution (crushing and grinding), classification for particle size fractions and concentration separation (flotation and magnetic separation). The referred processing method also results in materials with low added economic value, called tailings, due to their low iron content. Since ore processing methods generally involve the addition of water, the tailings are usually disposed of in the form of slurries in reservoirs called dams.

The mining industry currently produces hundreds of millions of tons of tailings per year. A significant part of this material is disposed of in dams, which generates enormous construction, operation and management costs, as well as serious environmental risks, and risks of major disasters, such as breaches. Any failures in dams can consequently release millions of cubic meters of tailings into the environment, making communities homeless, contaminating drinking water reserves, such as rivers and lakes, and causing the devastation of local fauna and human and animal livelihoods in the affected region. Despite the efforts and available technologies, the breaching of mining tailing containment dams is still responsible for causing accidents, which are often catastrophic and carry serious social, environmental and economic consequences.

Considering this overview, the mining sector has made large investments to develop processes that minimize the impacts generated by its general activity and, in particular, by mining tailings. The development of new processes that seek to mitigate the problems resulting from iron ore processing is therefore fundamental for the mining industry.

One of the alternatives to minimize impacts is the development of a process that is able to replace the disposal of tailings in dams with the disposal of tailings in piles after dewatering.

Tailings generated in iron ore processing operations can be classified into two types:

Sandy tailings, containing approximately 95% of particles with a particle size of above 10 μm and easy permeability. In most installations, these tailings are generated in the unit operation of concentration by flotation, but they can also be obtained in other concentration processes, such as in magnetic concentration.

Ultra-fine tailings or slurry, normally containing 60% or more of particle content with a particle size below 10 μm and with greater difficulty in terms of permeability. These tailings are generated in the unit operation of desliming, which prepares the slurry for the concentration step (flotation or magnetic separation).

Sandy tailings can be dewatered in equipment such as sieves or filters. Due to the large volumes of generated tailings and the low capacity of the sieves, the most feasible alternative is the dewatering in filters.

The ultra-fine tailings can be dewatered in conventional or high-density thickeners (HD—High Density) followed by a filter, or even in paste thickeners. Each type of thickening has its limitations; for instance, the thickening in paste form is not recommended for operations in the Quadrilátero Ferrífero region in Minas Gerais due to the local topography.

The use of conventional processes to dewater tailings from iron ore processing, especially ultra-fine tailings, presents serious operational problems, especially with regard to their efficiency. The most efficient dewatering technologies available on the market require high investments in capital assets (CapEx) and have high operating expenses (OpEx). Therefore, one of the main challenges for the disposal of tailings in piles is the efficient and economically feasible dewatering.

In the state of the art, there are processes for the disposal of tailings in piles, such as the one described in Boccamino (BOCCAMINO, G. D. Development of a geometry to pile up iron ore dewatered tailings—Case study for tailings generated in the itabirite ore treatment plant (ITM-I) in operation at the peak mine. Master's Thesis at UFOP [Federal University of Ouro Preto]. Ouro Preto, 2017). The document consists of a gathering of general information taken from the scientific literature on piling up iron ore tailings. The presented experimental data only show that it would be possible to stack 100% sandy tailings after the thickening and filtering steps. On the other hand, since the thickened or filtered ultra-fine tailings did not present good piling characteristics, sterile rock material was inserted in the pile.

In the process described by Boccamino, the tailings are not processed together and are never mixed, since, according to the document, each region of the pile should contain a type of tailings. It is important to point out that the author did not mention any information regarding the constructive and stability-related parameters of the piles over time, nor were there any considerations regarding efficiency and economic feasibility.

Patent application U.S. 2018/0111131 discloses an integrated process for iron recovery from low-grade iron ore. The referred process includes the steps of comminution (crushing and grinding), classification, flotation, regrinding of the intermediate iron concentrate, processing of the finer fraction and, afterwards, the disposal of the combined tailings in piles.

Patent application U.S. 2018/0111131 focuses mainly on the need for the mineralogical release of iron particles for greater recovery capacity, which requires the use of specific grinding equipment in addition to successive classification steps.

The process route of the present invention differs from the process route of U.S. 2018/0111131 in several aspects, among which: not including the finer particle processing step, which consists of another high-cost unit operation; having a single filtering step, instead of filtering the sandy and ultra-fine tailings separately; mixing a different proportion of tailings (80 to 90% of sandy tailings). Additionally, U.S. 2018/0111131 does not present information regarding the main technological challenge, which is the filtering of the total tailings (coarse and fine content). Document U.S. 2018/0111131 does not mention the type of filtering equipment used and the operating parameters that are required for the operation. This document does not present constructive parameters or comments about the stability of the piles over time either.

As to the patent application BR112017026396-3, whose ownership is the same as document U.S. 2018/0111131, it describes an integrated process to recover valuable metals from ores, mainly copper and gold. Patent application BR112017026396-3 describes a process that includes the steps of comminution (crushing and grinding), classification, flotation, regrinding of the intermediate concentrate, processing of the finer fraction and, afterwards, the disposal of the combined tailings in piles.

As well as U.S. 2018/0111131, document BR112017026396-3 focuses mainly on the need for the mineralogical release of metallic particles for greater recovery capacity, which requires the use of specific grinding equipment in addition to successive classification steps.

The process route of the present invention differs from the process route of BR112017026396-3 in several aspects, among which:

- Presenting specific information for the processing of iron ore, and basic non-metals whose chemical-mineralogical properties are significantly distinct;
- Not including the finer particle flotation step, preceded by regrinding, which consists of a significantly relevant high-cost unit operation, necessary in the three embodiments of processes claimed in document BR112017026396-3;
- Having a single filtering step, instead of separately filtering the sandy tailings and the ultra-fine tailings, as required in embodiments 1 and 2 of patent application BR112017026396-3;
- Not including the classification step after flotation required in embodiment 3 of patent application BR112017026396-3;
- Using different particle size for the materials: the coarse fraction in application BR112017026396-3 refers to particles larger than 75 µm and smaller than 750 µm, and finer fraction refers to particles smaller than this mesh, while in the present patent application the coarse fraction refers to particles smaller than 150 µm and larger than 10 µm and the finer particle fraction refers to slurry particles (<45 µm).

Additionally, as in U.S. 2018/0111131, patent application BR112017026396-3 does not present information regarding the main technological challenge, which is the filtering of the tailings. This document does not mention the type of filtering equipment used and the operating parameters that are required for the operation. The document does not present constructive parameters or comments about the stability of the piles over time either.

The developed process, which is the object of the present patent application, is part of this context and presents an economically and technically feasible solution for the disposal of tailings stemming from the iron ore processing method in piles and no longer in tailing dams.

OBJECTIVES OF THE INVENTION

It is an objective of the present invention promoting a process of disposal of tailings stemming from the iron ore processing method that does not involve tailing dams.

It is a further objective promoting a more sustainable tailing disposal process, as it provides a more effective use of water, a significantly smaller volume of tailings generation and, consequently, a smaller impacted area for final tailings disposal.

other objective of the present invention is promoting a process of disposal of tailings in piles in an economically and technically feasible manner.

It is still an objective of the present invention proving the constructive feasibility and stability of structures for the disposal of tailings in piles.

It is also an objective of the present invention promoting a process of tailings disposal in piles that can be added to any conventional iron ore processing plant without the need for any change in the process flowchart, since there are numerous conventional plants in operation, mainly in the Quadrilátero Ferrífero—MG region [state of Minas Gerais].

SUMMARY OF THE INVENTION

The present invention discloses a process of disposal of tailings in piles stemming from the iron ore processing method, comprising the steps of thickening the ultra-fine tailings, thickening the sandy tailings, mixing of the tailings in the proportion of 80 to 90% by weight of sandy tailings and 10 to 20% by weight of ultra-fine tailings (sludge), addition of coagulant, addition of flocculant, filtering of the mixture and piling the filtered tailings.

Unlike traditional processes, the present invention promotes an economically and technically feasible tailings disposal process in piles that can be added to any conventional iron ore concentration plant without the need for any change in the process flowchart.

BRIEF DESCRIPTION OF THE DRAWINGS

The present invention is described in detail based on the respective figures.

DETAILED DESCRIPTION OF THE INVENTION

Although the present invention may be susceptible to different embodiments, preferred embodiments are shown in the drawings and in the following detailed discussion, with the understanding that the present description is to be considered an example of the principles of the invention and that it is not meant to limit the present invention to what was illustrated and described herein.

Unless otherwise noted, all parts and percentages are indicated by weight.

The main approach of the present invention is related to a process of disposal in piles of tailings stemming from the iron ore processing method, comprising the following steps:
- A. thickening the ultra-fine tailings with a high-density thickener (HD—High Density);
- B. thickening the sandy tailings with a conventional thickener;
- C. mixing the tailings in the proportion of 80 to 90% by weight of sandy tailings and 10 to 20% by weight of ultra-fine tailings and adding the coagulant for the pre-treatment 1 of the tailings mixture;
- D. performing the pre-treatment 2 of the tailings mixture with the addition of a flocculant agent;
- E. filtering the tailings mixture in a vertical vacuum disc filter;
- F. piling the filtered tailings mixture.

The iron ore concentration process that is most used by the mining industry consists of flotation. The use of this process requires previous desliming steps, which consist of removing the ultra-fine ore, which impairs the efficiency of the concentration process.

Figure 1A:
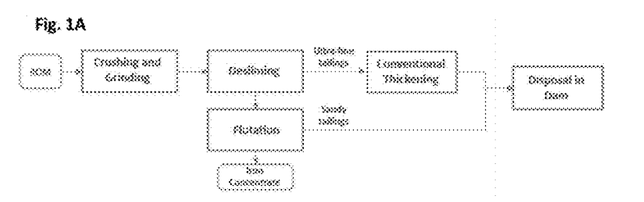
FIG. 1 illustrates a comparative flowchart of the state of the art (1A) and of the disposal route in tailing piles of the present invention (1B)

In general, the desliming of this ore is carried out using equipment such as hydrocyclones. As presented by FIG. 1, the desliming overflow, which is composed by the ultra-fine ore fractions, leads to a subsequent process known as thickening. In the thickening step, process water is recovered while the ultra-fine material is thickened. In the state of the art, the thickened ultra-fine material is destined to tailings dams, as represented in FIG. 1A. The outflow from the desliming step called underflow goes to the flotation step. Flotation then generates the final product of the process, which is the iron ore concentrate, as well as the sandy tailings that are disposed of in dams, as represented in FIG. 1A.

Figure 1B:
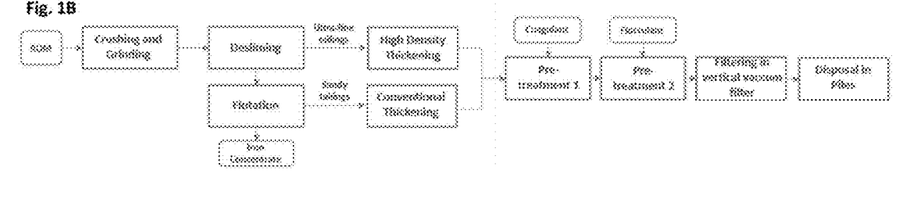

The present invention uses ultra-fine tailings from the desliming process and sandy tailings from the flotation process as starting material. The tailings are thickened, mixed, treated, filtered and piled, as represented in FIG. 1B and explained in detail afterwards.

The ultra-fine tailings from desliming basically comprise gangue minerals, particularly quartz and kaolinite, and iron minerals. Typically, the ultra-fine tailings have about 60% particles smaller than 10 µm and 20% smaller than 3 µm, in addition to a maximum particle size (top size) of nearly 45 µm.

The sandy tailings from the flotation basically consist of quartz and hematite minerals. Typically, the sandy tailings have about 90% particles smaller than 150 µm, 50% smaller than 75 µm, 30% smaller than 45 µm and only 5% particles smaller than 10 µm.

Figure 2:
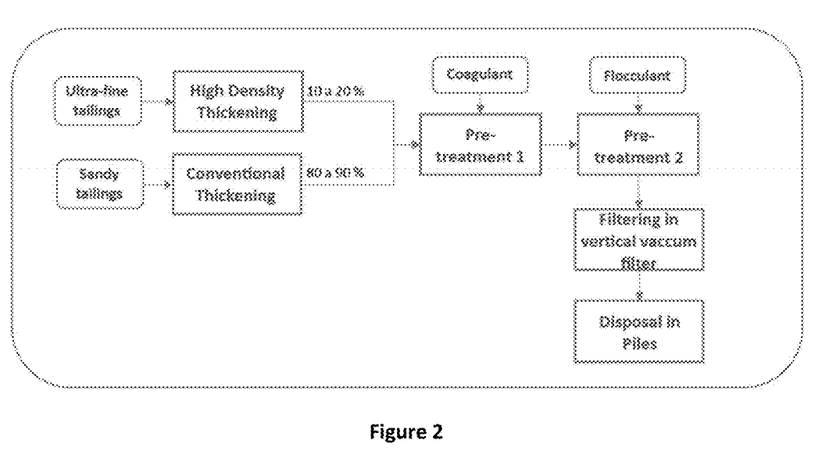
FIG. 2 illustrates a flowchart detailing the steps of the process of disposal of tailings in piles of the present invention.

As represented by the flowchart in FIG. 2, the first step of the process in the present invention consists of thickening the ultra-fine tailings using a high-density thickener (HD—High Density).

The use of conventional processes to dewater ultra-fine tailings presents serious operational problems, mainly with regard to its efficiency. For this reason, special thickening equipment is recommended, such as the high-density thickener (HD—High Density).

The high-density thickener has the capacity of processing material with a solid mass concentration between 20% to 45% and obtaining a denser underflow, with 35 to 55% solid mass concentration, for afterwards mixing it with sandy tailings. Preferably, the percentage of solids after thickening the ultra-fine tailings is from 45 to 55%.

The high-density thickener (HD—High Density) is characterized by having a lateral height equal to or greater than 6 meters, a smaller area compared to conventional thickeners and by promoting greater thickening of the underflow.

The second step in the process of the present invention consists of thickening the sandy tailings, as presented in FIG. 2, which occurs in parallel to the step of thickening the ultra-fine tailings. The sandy tailings stemming from the flotation constitute a slurry containing a mass concentration of solids of 30 to 45% and a large number of bubbles. Conventional thickeners have the ability to raise the mass concentration of solids in the slurry to 60 to 70%, the most efficient point for subsequent filters; to reduce the incidence of bubbles, in order to enable the transportation of slurry by horizontal slurry pumps; and recover water for reuse in the process. Preferably, the percentage of solids after thickening the sandy tailings is 65%.

As presented in FIG. 2, the third step of the process of the present invention consists of mixing the tailings, preferably in the proportion of 80 to 90% by weight of sandy tailings and 10 to 20% by weight of ultra-fine tailings and adding the coagulant to the pre-treatment 1 of said tailings mixture.

After carrying out tests with different percentages of each type of tailing, it is recommended the use of at most 90% by weight of sandy tailings, since the greater the amount of sandy tailings, the greater the wind drag after building the piles. For the disposal of only sandy tailings, a very efficient or aggressive wind drag combat system must also be provided, because when the surface moisture records values below 5.5% (mining moisture), the volume of dragged particles is very high. Wind drag is significantly reduced with the presence of ultra-fine tailings together with the sandy tailings.

With regard to the proportion of used ultra-fine tailings, it is recommended the use of at most 20% by weight of ultra-fine tailings, since exceeding this percentage leads to a significant drop in performance in terms of the workability aspect of the piles. This happens because the moisture of the total filtered tailings exceeds the critical moisture, above 100% of the material saturation degree, causing great difficulty in the construction of the landfill, with the presence of a "rubbery" behavior (large openings in the landfill generated by the attempt to move trucks). Therefore, it is not possible to compact the tailings immediately after they are disposed of in the pile. If more than 20% of ultra-fine tailings are used, a resting period is required after the tailings are disposed of in the landfill, between 4 to 5 days, to ensure moisture reduction, and only then compacting the tailings. This fact renders the operationalization of the process unfeasible.

Therefore, one concludes that the use of 80 to 90% by weight of sandy tailings and, consequently, 10 to 20% of ultra-fine tailings is the ideal proportion for an efficient and technically and economically viable process, however, without limiting the use of other proportions by means of the present invention.

The mixture of the sandy tailings with the ultra-fine tailings is carried out in a stirring tank, with a stirring time of 10 to 15 minutes, or until the material is completely homogenized. In this same mixing tank, coagulant reagent is added at the rate of 100 to 130 g/t (grams of coagulant per ton of tailings mixture) and the stirring must be maintained for at least 10 minutes more.

The used coagulant reagent must be a product that promotes coagulation in order to remove suspended solids, perform solid/liquid separation and accelerate the sedimentation of solids. An example of this reagent is the coagulant WD 545PI, commercialized by the company Werdyal Tratamento Ambiental Ltda. The addition of a coagulant can reduce the pH of the mixture, enhancing the subsequent filtration step.

According to FIG. 2, the fourth step of the process of the present invention consists of adding a flocculant reagent to the tailings mixture. The purpose of adding this reagent is the flocculation of fine particles into long flakes, thus allowing a greater efficiency when filtering the material.

It is indispensable that the addition of flocculant be carried out immediately before the filtering step, since the shear forces resulting from agitation or pumping can break the flakes, impairing the integrity thereof. For this reason, installing a flocculation box immediately before filtering is recommended.

The flocculant agent is added at a rate of 15 to 30 g/t (grams of flocculant per ton of tailings mixture). An example of this reagent is the anionic flocculant powder FLOPAM AN 934 MPM, commercialized by the company SNF Floerger.

As presented in FIG. 2, the fifth step of the process of the present invention consists of filtering the mixture in a vertical vacuum disc filter. The tailings mixture, after adding flocculant to the flocculation box, is subjected to a filtering process with a unit filtering rate (UFR) from 1.4 to 2.4 t/h/m$^2$. The vacuum disc filter must operate in a speed range varying from 1 to 2 rpm. The moisture content of the final filtered cake is from 10 to 18%, preferably from 13 to 14%.

The filtered tailings then proceed to the last step of the process of the present invention, according to FIG. 2, which consists of the disposal in piles. The filtered tailings are transported from the filtration plant to the disposal site, where they are unloaded.

The construction method commonly adopted in sterile pile operations is applied using layers with different heights. In this method, a crawler tractor levels ("breaks") the pile of material, spreading the tailings and controlling the advance of the formation of the uniform thickness layer, and creating a new area ("place") for the materials to be disposed of by the trucks. The process repeats until the final height level of the next layer. The compaction of the landfills is carried out through the movement of trucks and tractors over the landfill surface.

Thus, although only a few embodiments of the invention have been shown, it will be understood that several omissions, substitutions, and alterations can be made by a person skilled in the art, without teaching away the spirit and scope of the present invention. The embodiments described are to be considered only as illustrative and not restrictive in any aspects.

It is expressly provided that all combinations of elements that perform the same function in substantially the same way to achieve the same results are within the scope of the invention. Substitutions of elements from one described embodiment to another are also fully intended and contemplated. It is also necessary to understand that the drawings are not necessarily made in scale, being only conceptual in nature. The intent is, therefore, to be limited, as indicated by the scope of the attached claims.

The following example is offered in order to assist in the understanding of the present invention and should not be considered as limiting its scope.

EXAMPLE

Tests were carried out for the processing of iron ore tailings, in a pilot plant, with the objective of evaluating the technical-operational feasibility of the disposal of tailings in piles. To carry out the tests, tailings were used from the processing of compact itabirite stemming from iron ore operations located in the Quadrilátero Ferrífero region (state of Minas Gerais, Brazil).

Table 1 shows the average chemical composition of the sandy tailings and ultra-fine tailings used in the pilot plant tests.

TABLE 1

| | Chemical composition of iron ore tailings | | | | | | | | |
|---|---|---|---|---|---|---|---|---|---|
| | Fe (%) | SiO$_2$ (%) | P (%) | Al$_2$O$_3$ (%) | Mn (%) | TiO$_2$ (%) | CaO (%) | MgO (%) | PPP (%) Loss due to calcination |
| Sandy Tailings | 19.3 | 70.5 | 0.02 | 0.61 | 0.01 | 0.03 | 0.01 | 0.03 | 1.16 |
| Ultra-fine Tailings | 48.9 | 16.3 | 0.13 | 5.39 | 0.18 | 0.28 | 0.02 | 0.12 | 7.39 |

The first step consisted of thickening the ultra-fine tailings in a high-density thickener (HD—High Density). The obtained underflow had a solid mass concentration of 45% to 55%.

The second step consisted of thickening the sandy tailings in a conventional thickener. A conventional thickener measuring 8.2 meters in diameter was used, with a processing capacity of 110 t/h. The unit area was 0.020 m$^2$/t/day. Despite a flocculant dosing system has been installed, it has not required for the tested tailings, as it has been possible to reach the expected concentration of solids in the underflow (60 to 65%), without an extensive presence of solids in the overflow (<0.3%). Even with the sparse presence of solids, the overflow was cloudy, as the pH of the slurry in the thickener feed, or flotation tailings, has been between 8.4 to 8.9 and at this pH value the ultrafine particles are dispersed, making the flow become a colloid.

The third step consisted of mixing the sandy tailings with the ultra-fine tailings in a stirring tank. Several tests were carried out to observe the behavior of tailings mixtures with different percentages of sandy tailings and ultra-fine tailings. However, the best results were obtained when the limit of 20% ultra-fine tailings and 90% sandy tailings was not exceeded, as can be seen in Table 2. Therefore, one has concluded that the use of 80 to 90% by weight of sandy tailings and, consequently, 10 to 20% of ultra-fine tailings is ideal for an efficient and technically and economically viable process. The stirring time for homogenization of the tailings mixture ranged from 10 to 15 minutes.

Figure 3:
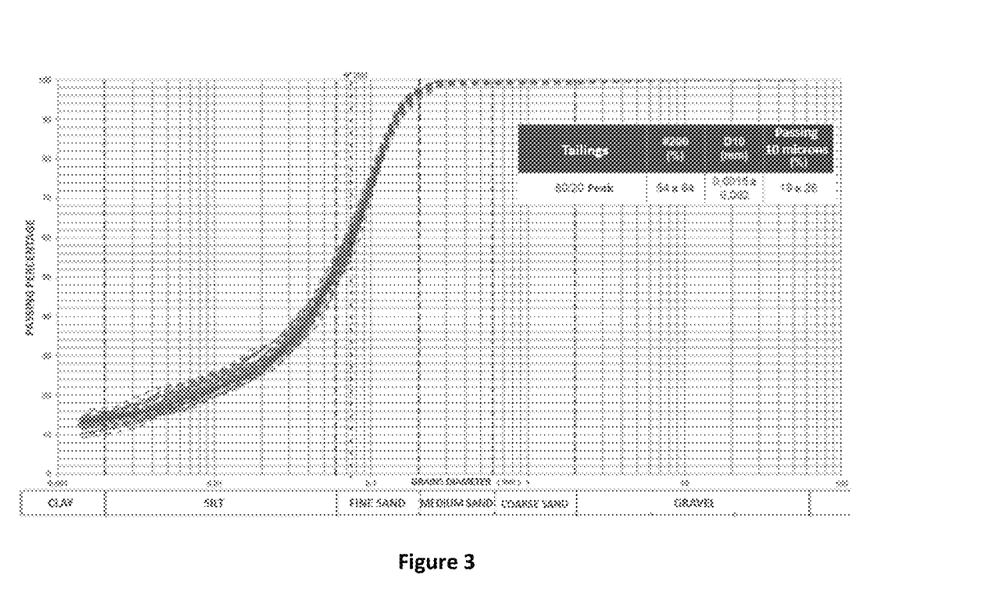
FIG. 3 illustrates the representative granulometric curve of the mixture that contains 80% sandy tailings and 20% ultra-fine tailings.
Figure 4:
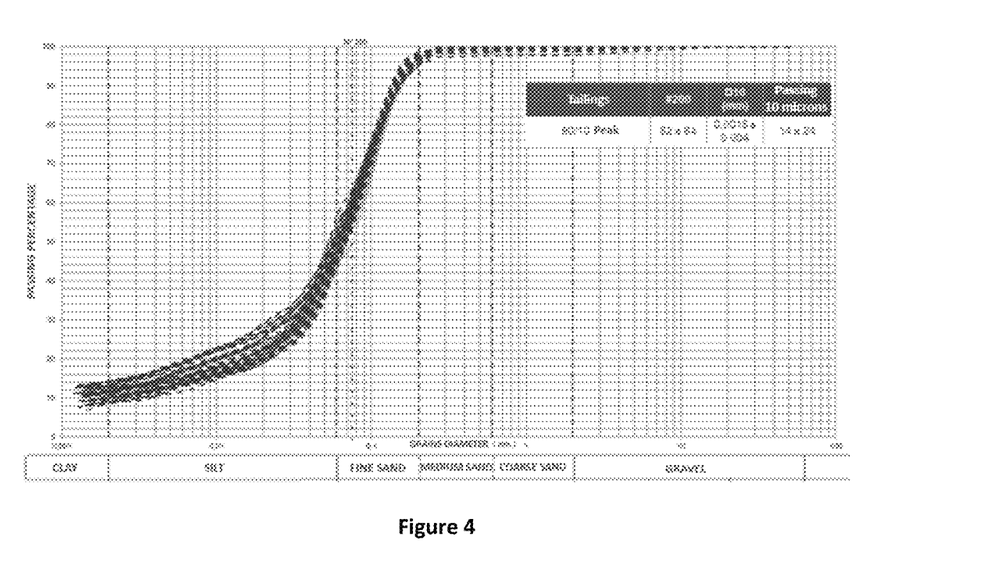
FIG. 4 presents the granulometric curve of the mixture that contains 90% sandy tailings and 10% ultra-fine tailings.

FIG. 3 presents the representative granulometric curve of the mixture that contains 80% of sandy tailings and 20% of ultra-fine tailings. FIG. 4 presents the granulometric curve of the mixture that contains 90% sandy tailings and 10% ultra-fine tailings.

tailings, the amount of added flocculant was 21 g/t (grams of coagulant per ton of tailing mixture). For the tests with the mixture containing the proportion of 90% sandy tailings to 10% ultra-fine tailings, the amount of added flocculant was 18 g/t (grams of coagulant per ton of tailing mixture). The flocculant was added in the flocculation box, which is located immediately before the vacuum disc filter.

The fifth stage of the process consisted of filtering the mixture in a vertical vacuum disc filter. A FLSmidth filter was used with 10 discs measuring 6 meters in diameter, with 47 m$^2$ of filtering area.

The tailings mixture was filtered, immediately after the addition of flocculant, and the unit filtration rate (UFR) ranged from 1.4 to 2.4 t/h/m$^2$, as can be seen in Table 2. The moisture content of the final filtered cake was about 14%. The vacuum disc filter operated in a speed range of 1 to 2 rpm.

TABLE 2

Result of the tailing mixture filtering in a vacuum disc filter

| | Real Ratio | | | | | UFR (t/h/m$^2$) | | | Dry Cake | |
| | Desired | | Ultra- | Dp | Drs | Solids | | | Moisture | | |
| Date | Ratio | Sandy | fine | t/m$^3$ | t/m$^3$ | % | wet | dry | % | t/h | pH |
|---|---|---|---|---|---|---|---|---|---|---|---|
| 14/jun | 57/43 | 57.75 | 42.25 | 1.51 | 3.31 | 48.41 | 0.24 | 0.20 | 17.94 | 9.26 | 6.89 |
| 01/jun | 70/30 | 72.6 | 27.4 | 1.83 | 3.13 | 66.66 | 0.78 | 0.67 | 13.78 | 31.61 | 6.15 |
| 01/jun | 70/30 | 72.6 | 27.4 | 1.8 | 3.13 | 65.32 | 1.51 | 1.28 | 15.05 | 60.37 | 5.99 |
| 06/jun | 70/30 | 71.23 | 28.77 | 1.69 | 3.15 | 59.86 | 0.99 | 0.83 | 16.08 | 39.05 | 7.05 |
| 09/jun | 70/30 | 70.13 | 29.87 | 1.76 | 3.16 | 63.19 | 1.10 | 0.92 | 15.97 | 43.44 | 6.84 |
| 09/jun | 70/30 | 70.13 | 29.87 | 1.76 | 3.16 | 63.19 | 1.25 | 1.04 | 16.62 | 48.99 | 6.94 |
| 12/jun | 70/30 | 70 | 30 | 1.82 | 3.16 | 65.91 | 1.64 | 1.40 | 14.52 | 65.77 | 6.86 |
| 31/may | 80/20 | 81 | 19 | 1.74 | 3.03 | 63.50 | 0.70 | 0.61 | 12.97 | 28.63 | 6.3 |
| 31/may | 80/20 | 81 | 19 | 1.74 | 3.03 | 63.50 | 1.43 | 1.25 | 12.76 | 58.63 | 6.07 |
| 05/jun | 80/20 | 79.8 | 20.2 | 1.74 | 3.04 | 63.35 | 1.48 | 1.24 | 16.33 | 58.20 | 6.26 |
| 05/jun | 80/20 | 79.8 | 20.2 | 1.79 | 3.04 | 65.74 | 1.98 | 1.68 | 15.25 | 78.87 | 6.51 |
| 06/jun | 80/20 | 80 | 20 | 1.69 | 3.04 | 60.82 | 1.36 | 1.14 | 16.08 | 53.64 | 7.05 |
| 14/jun | 80/20 | 80 | 20 | 1.65 | 3.04 | 58.68 | 1.28 | 1.10 | 14.10 | 51.68 | 6.6 |
| 08/aug | 80/20 | 80 | 20 | 1.68 | 3.04 | 60.32 | 1.34 | 1.16 | 13.72 | 54.34 | 6.6 |
| 16/aug | 80/20 | 80 | 20 | 1.51 | 3.04 | 50.33 | 0.90 | 0.78 | 13.05 | 36.78 | 6.6 |
| 22/aug | 80/20 | 80 | 20 | 1.65 | 3.04 | 58.70 | 1.30 | 1.12 | 14.00 | 52.55 | 6.6 |
| 29/aug | 80/20 | 80 | 20 | 1.71 | 3.04 | 61.87 | 1.35 | 1.16 | 13.98 | 54.58 | 6.6 |
| 15/sep | 80/20 | 80 | 20 | 1.68 | 3.04 | 60.32 | 1.35 | 1.16 | 13.81 | 54.69 | 6.6 |
| 21/sep | 80/20 | 80 | 20 | 1.73 | 3.04 | 62.88 | 1.36 | 1.17 | 14.01 | 54.96 | 6.83 |
| 28/sep | 80/20 | 80 | 20 | 1.74 | 3.04 | 63.38 | 1.35 | 1.16 | 13.99 | 54.57 | 6.95 |
| 03/act | 80/20 | 80 | 20 | 1.76 | 3.04 | 64.35 | 1.39 | 1.20 | 14.02 | 56.17 | 7.01 |
| 02/jun | 90/10 | 89.9 | 10.1 | 1.74 | 2.92 | 64.67 | 1.01 | 0.88 | 12.7 | 41.44 | 6.27 |
| 02/jun | 90/10 | 89.9 | 10.1 | 1.71 | 2.92 | 63.13 | 2.43 | 2.12 | 12.96 | 99.41 | 6.32 |
| 03/jan | 90/10 | 90 | 10 | 1.74 | 2.92 | 64.68 | 2.20 | 1.90 | 13.56 | 89.38 | — |

In the mixing tank itself, the WD 545PI coagulant reagent, commercialized by the company Werdyal Tratamento Ambiental, was added at the original concentration of 89%. For the tests with the mixture containing the proportion of 80% sandy tailings to 20% ultra-fine tailings, the amount of added coagulant was 114 g/t (grams of coagulant per ton of tailing mixture). For the tests with the mixture containing the proportion of 90% sandy tailings to 10% ultra-fine tailings, the amount of added coagulant was 116 g/t (grams of coagulant per ton of tailing mixture). The tank stirring was maintained for 10 minutes after the addition of the coagulant. The addition of the coagulant reduced the pH of the mixture from 8.5-9.0 to 6.0-8.0. The increase in acidity benefits the subsequent filtration step.

The fourth step consisted of adding the anionic flocculant powder reagent FLOPAM AN 934 MPM, commercialized by the company SNF Floerger, diluted at 0.5%, to the tailings mixture. For the tests with the mixture containing the proportion of 80% sandy tailings to 20% ultra-fine Regarding disc filters, two types of filtering fabrics from different suppliers were used, both of which yielded an excellent performance. They were:

Casfil supplier: 100% polypropylene fiber; monofilament string; satin texture; grammage 285 g/m$^2$; thickness 0.48 mm; air permeability 36 m$^3$/min/m$^2$; calendered finish.

Valmet supplier: PT2031 SK filter screen; monofilament string.

The special slurry pump used was a Nash-Krogh model (outlet ∅=1.5"×rotor ∅=9"), which proved to be an excellent option to replace the barometric leg.

The use of the coagulant and flocculant allowed for a good filtering performance, without impacting the useful life of the filter fabric, which remained around 2,100 hours, without foundation and without the need to use washing water.

The filtered tailings then proceeded to the step of disposal in piles. The filtered tailings were transported from the filtration plant to the disposal site, where they were unloaded, spread, and shaped into layers using a crawler tractor.

The first built experimental pile had the following dimensions: 160 meters length, 60 meters width, and 8.2 meters height. The construction of this experimental pile was carried out in layers, with height ranging from 600 mm to 4,000 mm. The dimensions of the subsequent built piles ranged according to the experience of the involved geotechnicians.

Tests carried out on all layers showed excellent geotechnical results. In the layers between 600 mm and 1,000 mm, optimum workability was identified with degrees of compaction near optimum humidity.

The compaction of the landfills was carried out through the movement of trucks and tractors over the landfill surface. Table 3 presents the critical moisture values in the piles.

Figure 9:
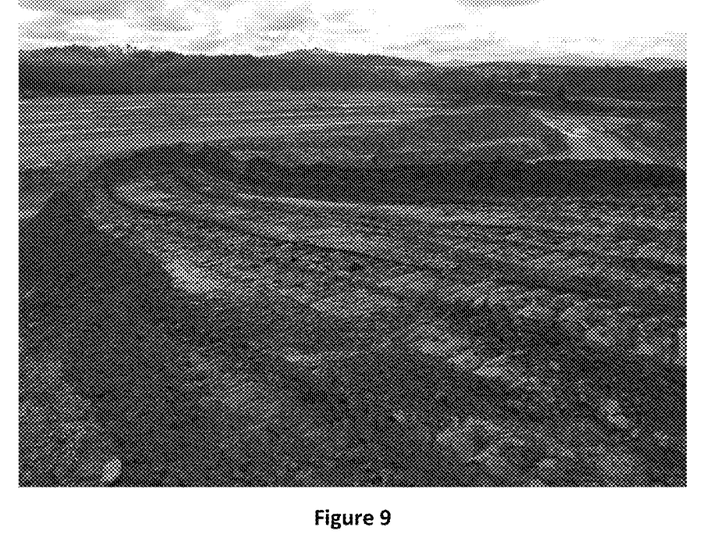
FIG. 9 presents a picture of the spread of the mixture of 90% sandy tailings and 10% ultra-fine tailings in the landfill.
Figure 10:
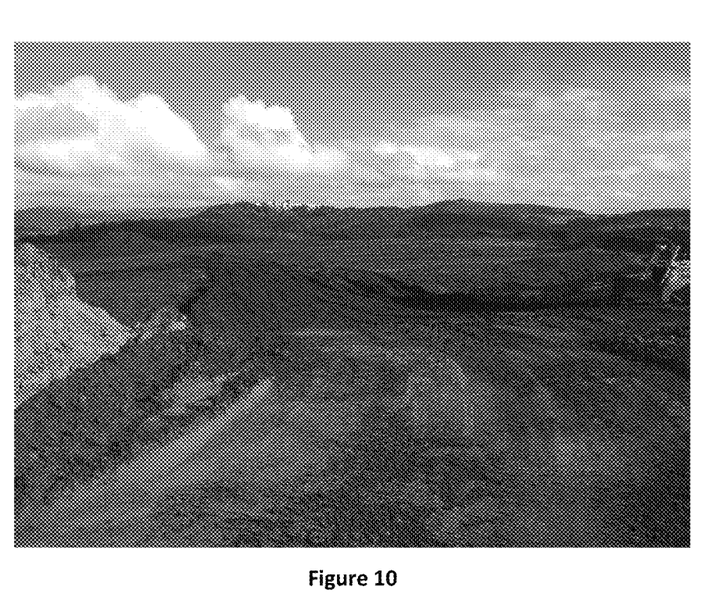
FIG. 10 presents a picture of the plateau after 3 days of spreading of the mixture of 90% sandy tailings and 10% ultra-fine tailings in the landfill.

FIG. 9 presents the behavior of the mixture containing 90% sandy tailings and 10% ultra-fine tailings after spreading the material, and FIG. 10 demonstrates the plateau 3 days after spreading the material.

Figure 11:
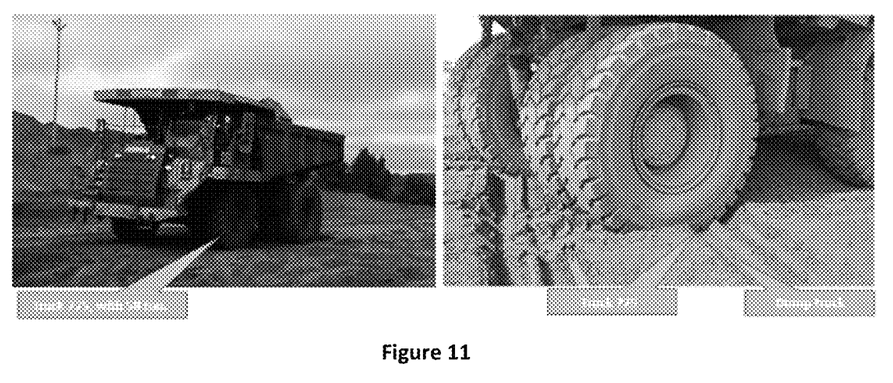
FIG. 11 presents a picture of the pile compression test using a loaded Model 775 off-road truck.

After the construction of the piles, a test was carried out with an off-road truck, model 775, loaded with approximately 60 tons of sterile. For the pile built with the mixture containing 80% of sandy tailings and 20% of ultra-fine tailings, the ground compression was equivalent with the dump truck, commonly used to build the piles, as shown in FIG. 11. This test validated all observations regarding workability in the other piles where only a dump truck was used.

Experimental landfills presented excellent results in terms of filtering and constructive workability, in addition to satisfactory results from field and laboratory geotechnical tests, and, for this reason, they are being recommended for

TABLE 3

Average results of the filtering and piling of tailing mixtures

| Proportion | | Dos. Coag. | Dos. Floc. | UFR (t/h/m$^2$) | Moisture in the Filter (%) | | Critical Moisture in the Pile (%) | |
|---|---|---|---|---|---|---|---|---|
| Sandy Tail. | Ultra-fine Tail. | g/t | g/t | Wet base | Mining | Geotechnical | Mining | Geotechnical |
| 100 | — | — | — | 2.49 | 13.0 | 14.9 | 17.94 | 9.26 |
| 90 | 10 | 116 | 18 | 2.27 | 14.4 | 16.8 | 13.78 | 31.61 |
| 80 | 20 | 114 | 21 | 1.53 | 14.5 | 17.0 | 15.05 | 60.37 |
| 70 | 30 | 110 | 25 | 1.38 | 15.3 | 18.0 | 16.08 | 39.05 |

Figure 5:
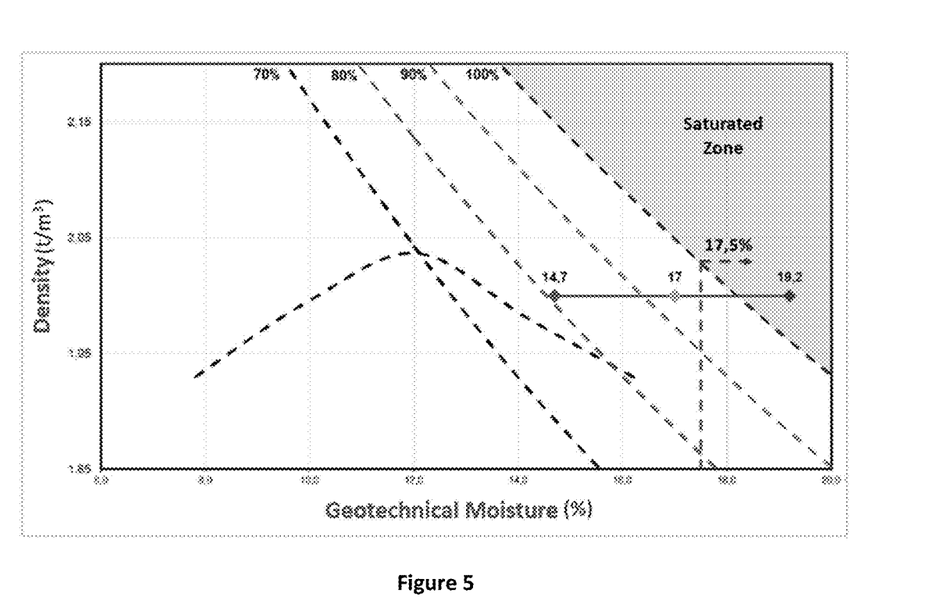
FIG. 5 presents the compacting curves for the mixture of 80% sandy tailings and 20% ultra-fine tailings.

The mixture containing 80% sandy tailings and 20% ultra-fine tailings had an average geotechnical moisture in the order of 17.0% at the outlet of the disc filter, with a good performance in general, but in some instances moisture levels were found that hindered the performance of activities at the landfill, identified in FIG. 5. For these occasions, it was necessary to let the material rest in order to dry for an average length of one day, so that there would be loss of moisture and it would be possible to work the material for conformation of the experimental landfill. FIG. 5 shows that, with a moisture of 17.5%, the material already reaches the saturated zone and thus reaches a level of difficult workability ("rubbery" behavior); however, this did not make the operation unfeasible.

Figure 6:
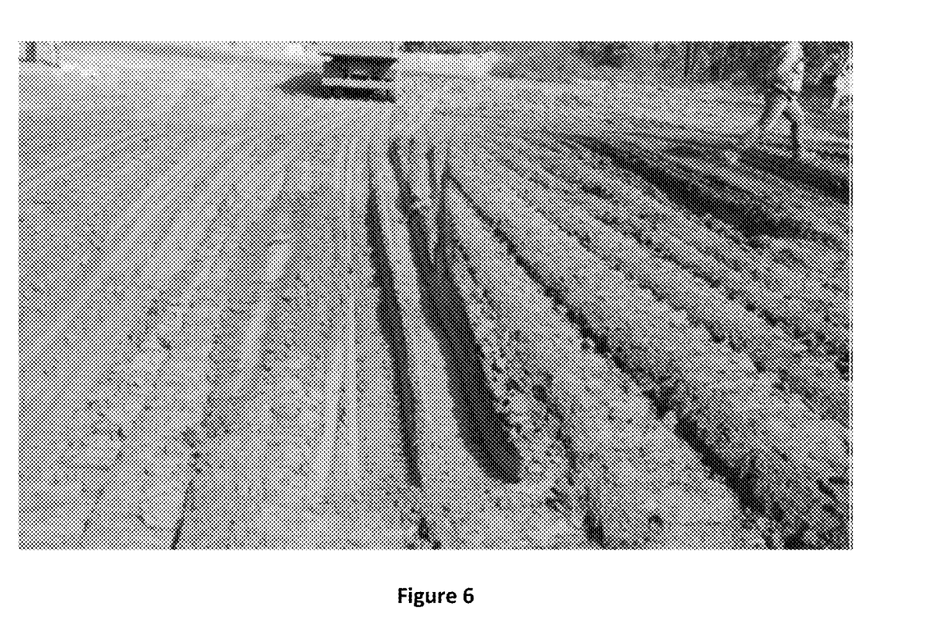
FIG. 6 presents a picture of the trail made by the dump truck wheel in the landfill built with a mixture of 80% sandy tailings and 20% ultra-fine tailings.
Figure 7:
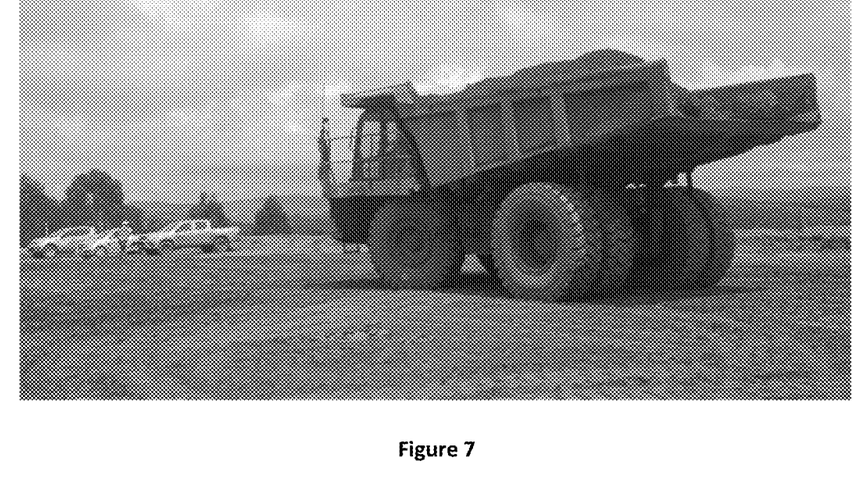
FIG. 7 presents a picture of the work area after completion of the landfill built with a mixture of 80% sandy tailings and 20% ultra-fine tailings.

From field observations, this landfill was considered satisfactory, and this proportion is being recommended for use in industrial scale filtered pile tailing projects, although some difficulties have been identified in relation to the workability of the material immediately after the filter outlet, as can be seen in FIG. 6 (wheel trails between 20 and 30 cm). FIG. 7 presents the workplace after completion of the landfill.

The mixture containing 90% sandy tailings and 10% ultra-fine tailings presented excellent workability without moisture values approaching critical moisture, without the occurrence of difficulties in the construction of the landfill. The variation in filter outlet moistures below the saturation zone can be found in FIG. 8.

Figure 8:
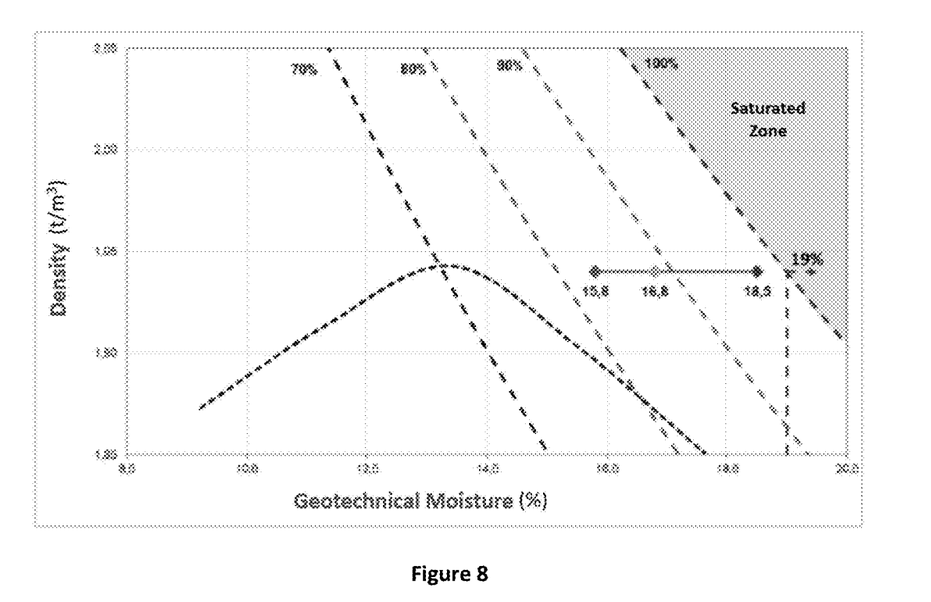
FIG. 8 presents the compacting curves for the mixture of 90% sandy tailings and 10% ultra-fine tailings.

It is observed in FIG. 8 that, from a moisture of 19.0%, the material already reaches the saturated zone and, therefore, it reaches a point of difficult workability. The tailings presented average geotechnical moisture in the order of 16.8%, with excellent workability. This experimental landfill had satisfactory results in terms of filtering and constructive workability.

future projects of disposal in filtered tailing piles. The project criteria and assumptions to be adopted must be determined according to the geometric configurations of the pile and the characteristics of its foundation.

Three forms of vegetation planting in the piles were further tested, namely (i) direct planting on the tailings, (ii) planting on a vegetal mesh and (iii) planting using a top soil layer.

Figure 12:
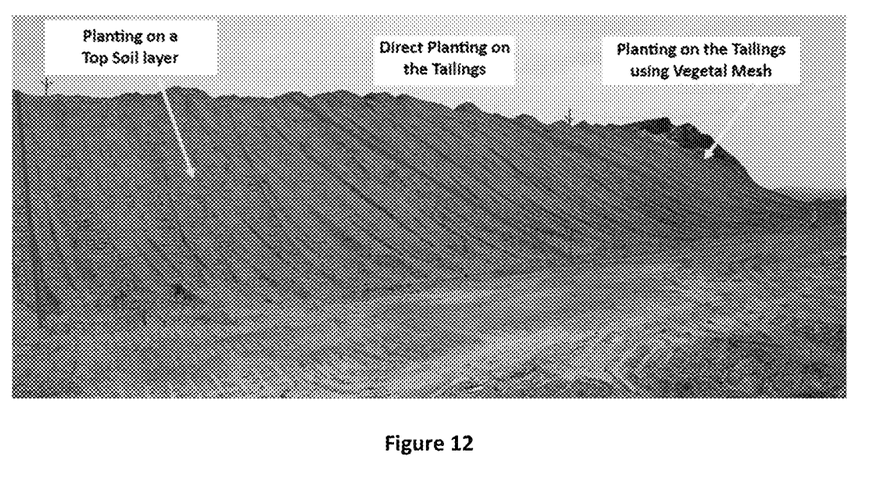
FIG. 12 presents a picture of the preparation and planting of vegetation in the piles.
Figure 13:
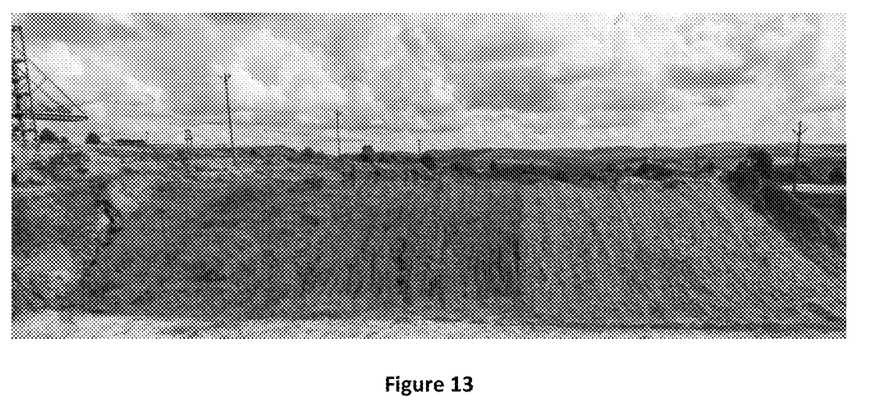
FIG. 13 presents a picture of the piles 6 months after planting the vegetation.

FIG. 12 exhibits a picture of a pile on the day of preparation and planting of vegetation, on Oct. 3, 2017. FIG. 13 shows a picture of the obtained result, 6 months later, on the slope of the pile containing 80% of sandy tailings plus 20% of ultra-fine tailings. In all cases, the result was similar and, as expected, planting over the top soil layer yielded a better performance. However, in industrial applications with continuous tailing pile evolution, there is a risk of not obtaining enough top soil. That said, for an industrial project, it is recommended to consider the use of a vegetable bio-web combined with hydro-seeding applied with a load of well-loaded seeds and inputs.

The invention claimed is:

1. A process of disposal in tailings piles stemming from an iron ore processing method, the process comprising:
   a. thickening ultra-fine tailings in a thickener, the ultra-fine tailings having a maximum particle size of about 45 microns;
   b. thickening sandy tailings in a thickener;
   c. mixing the sandy tailings with the ultra-fine tailings to provide a tailings mixture, and adding coagulant for pre-treatment 1 of the tailings mixture;
   d. performing a pre-treatment 2 of the tailings mixture by adding a flocculant agent;
   e. filtering the tailings mixture to provide filtered tailings; and
   f. piling of the filtered tailings.

2. The process of disposal in tailing piles, according to claim 1, wherein a) comprises a high-density thickener capable of processing material with a solid mass concentration of at least 20%.

3. The process of disposal in tailing piles, according to claim 1, wherein b) comprises a conventional type of thickener.

4. The process of disposal in tailing piles, according to claim 1, wherein c) comprises mixing the sandy tailings with the ultra-fine tailings in a proportion of 80 to 90% by weight of sandy tailings and 10 to 20% by weight of ultra-fine tailings.

5. The process of disposal in tailing piles, according to claim 1, wherein c) comprises adding coagulant in a proportion of 100 to 130 grams of coagulant per ton of tailing mixture.

6. The process of disposal in tailing piles, according to claim 1, wherein d) comprises adding the flocculant agent in a proportion of 15 to 30 grams of coagulant per ton of tailing mixture.

7. The process of disposal in tailing piles, according to claim 1, wherein e) comprises a filtering process performed in a vertical vacuum disc filter.

8. The process of disposal in tailing piles, according to claim 1, wherein e) comprises a filtering that results in a moisture content of a final filtered cake from 10 to 18%.

* * * * *